(12) United States Patent
Iliofotou et al.

(10) Patent No.: US 9,100,326 B1
(45) Date of Patent: Aug. 4, 2015

(54) AUTOMATIC PARSING OF TEXT-BASED APPLICATION PROTOCOLS USING NETWORK TRAFFIC DATA

(71) Applicant: Narus, Inc., Sunnyvale, CA (US)

(72) Inventors: Marios Iliofotou, Sunnyvale, CA (US); Ram Keralapura, San Jose, CA (US); Marco Mellia, Turin (IT); Ignacio Bermudez, Astoria, NY (US)

(73) Assignee: Narus, Inc., Sunnyvale, CA (US)

( * ) Notice: Subject to any disclaimer, the term of this patent is extended or adjusted under 35 U.S.C. 154(b) by 299 days.

(21) Appl. No.: 13/917,489

(22) Filed: Jun. 13, 2013

(51) Int. Cl.
| | |
|---|---|
| G06F 15/173 | (2006.01) |
| H04L 12/26 | (2006.01) |
| G06F 17/30 | (2006.01) |
| G06F 17/24 | (2006.01) |
| G06F 17/27 | (2006.01) |

(52) U.S. Cl.
CPC .......... *H04L 43/18* (2013.01); *G06F 17/30861* (2013.01); *G06F 17/30867* (2013.01); *G06F 17/30908* (2013.01); *G06F 17/24* (2013.01); *G06F 17/27* (2013.01)

(58) Field of Classification Search
None
See application file for complete search history.

(56) References Cited

U.S. PATENT DOCUMENTS

| | | | |
|---|---|---|---|
| 6,718,325 B1 * | 4/2004 | Chandra | 1/1 |
| 8,051,060 B1 * | 11/2011 | Vo et al. | 707/705 |
| 2009/0006645 A1 * | 1/2009 | Cui et al. | 709/236 |
| 2013/0077855 A1 * | 3/2013 | Coles et al. | 382/155 |
| 2013/0091152 A1 * | 4/2013 | Ionescu et al. | 707/754 |
| 2014/0006010 A1 * | 1/2014 | Nor et al. | 704/9 |

OTHER PUBLICATIONS

NPL, Wondracek et al. "Automatic Network Protocol Analysis," NDSS Conference Proceedings, Feb. 2008.*
Beddoe, Marshall, "Network Protocol Analysis Using Bioinformatics Algorithms", 2005.
Caballero, Juan, et al., "Dispatcher: Enabling Active Botnet Infiltration Using Automatic Protocol Reverse-Engineering", CCS Conference 2009.
Leita, Corrado, et al., "ScriptGen: An Automated Script Generation Tool for Honeyd", ACSAC Conference 2005.

* cited by examiner

*Primary Examiner* — Wing F Chan
*Assistant Examiner* — Padma Mundur
(74) *Attorney, Agent, or Firm* — Kwan & Olynick LLP

(57) ABSTRACT

A method for analyzing an application protocol of a network. The method includes extracting non-alphanumeric tokens from conversations of the network, selecting frequently occurring non-alphanumeric token as a field delimiter candidate for dividing each conversation into a slice-set, analyzing slice-sets of the conversations to determine a statistical measure of matched slices for each conversation, and -o determine a field delimiter candidate score by aggregating the statistical measure of matched slices for all conversations, and selecting the non-alphanumeric token as the field delimiter of the protocol based on the field delimiter candidate score associated with the non-alphanumeric token.

18 Claims, 10 Drawing Sheets

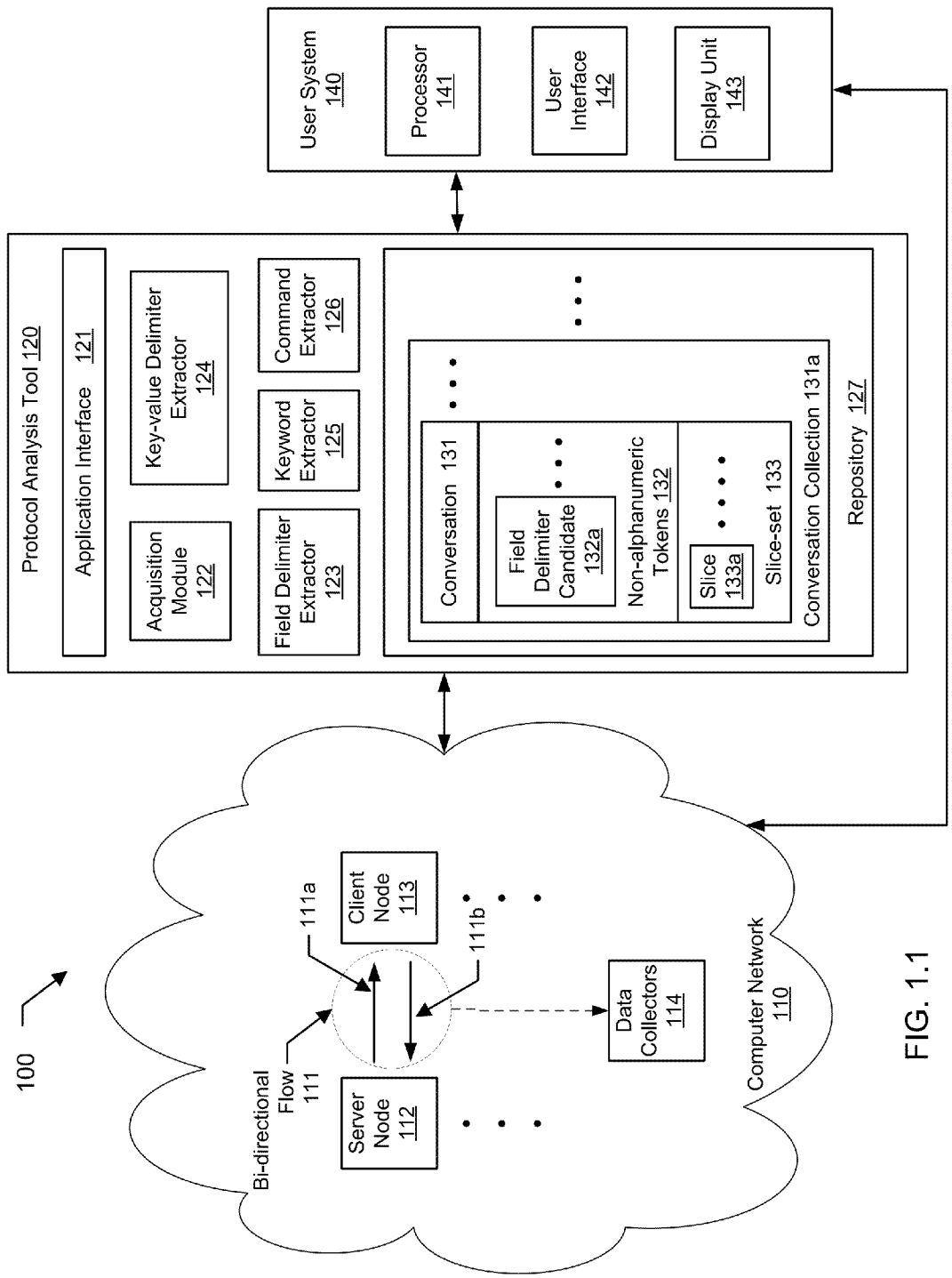
FIG. 1.1

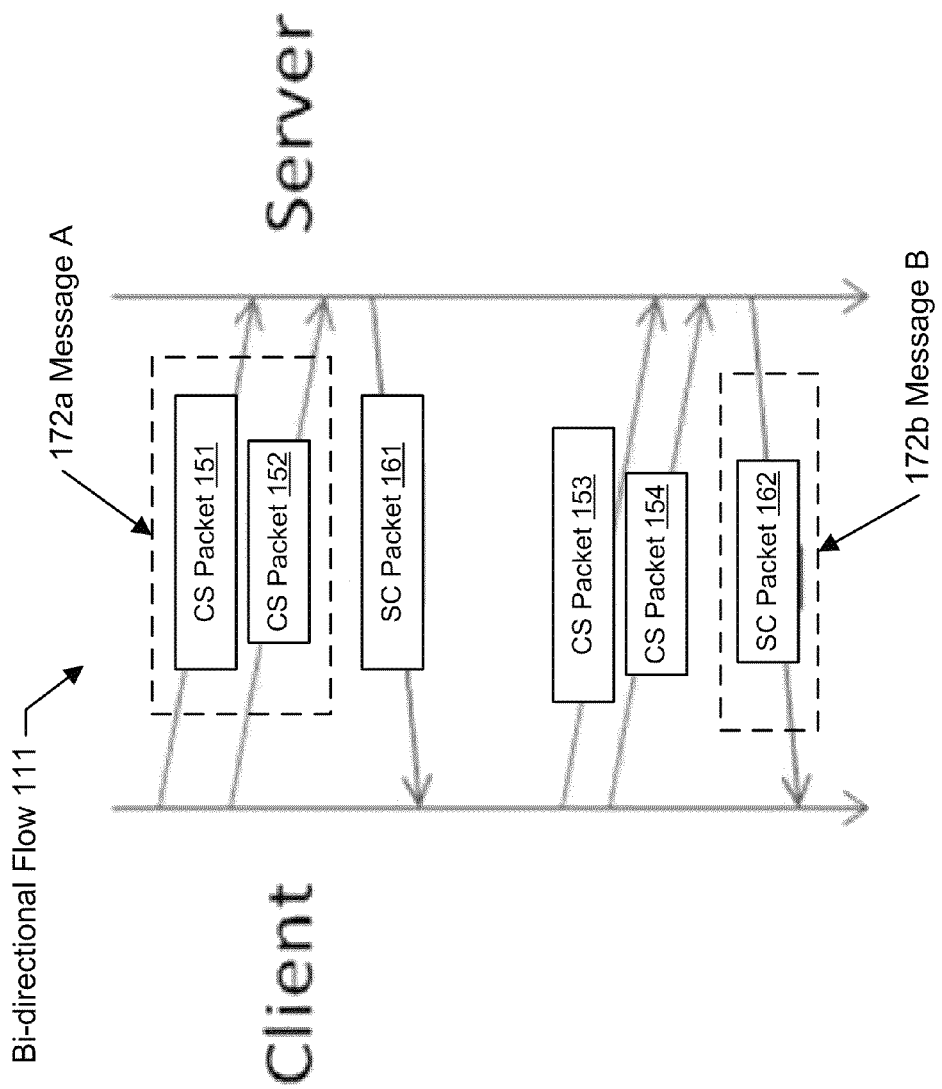
FIG. 1.2

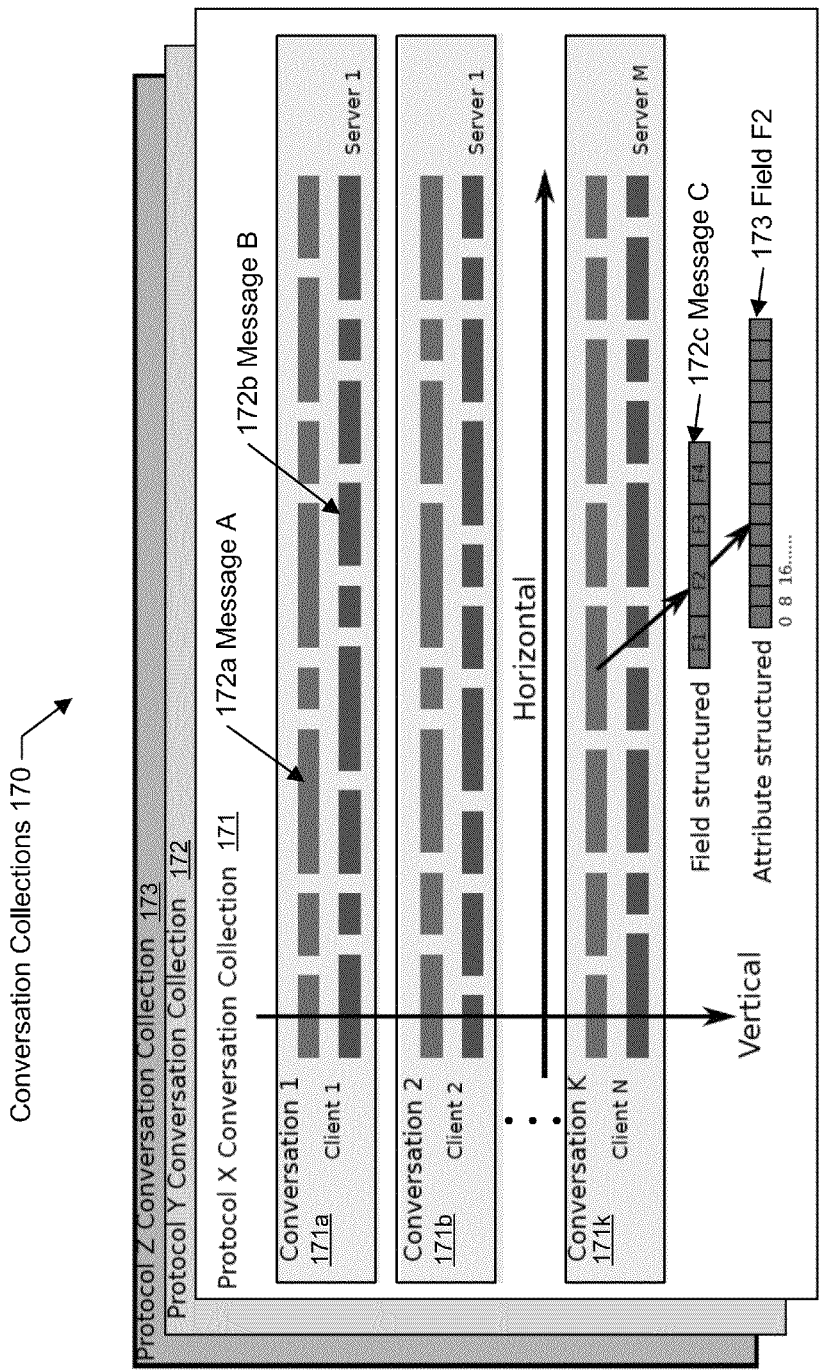
FIG. 1.3

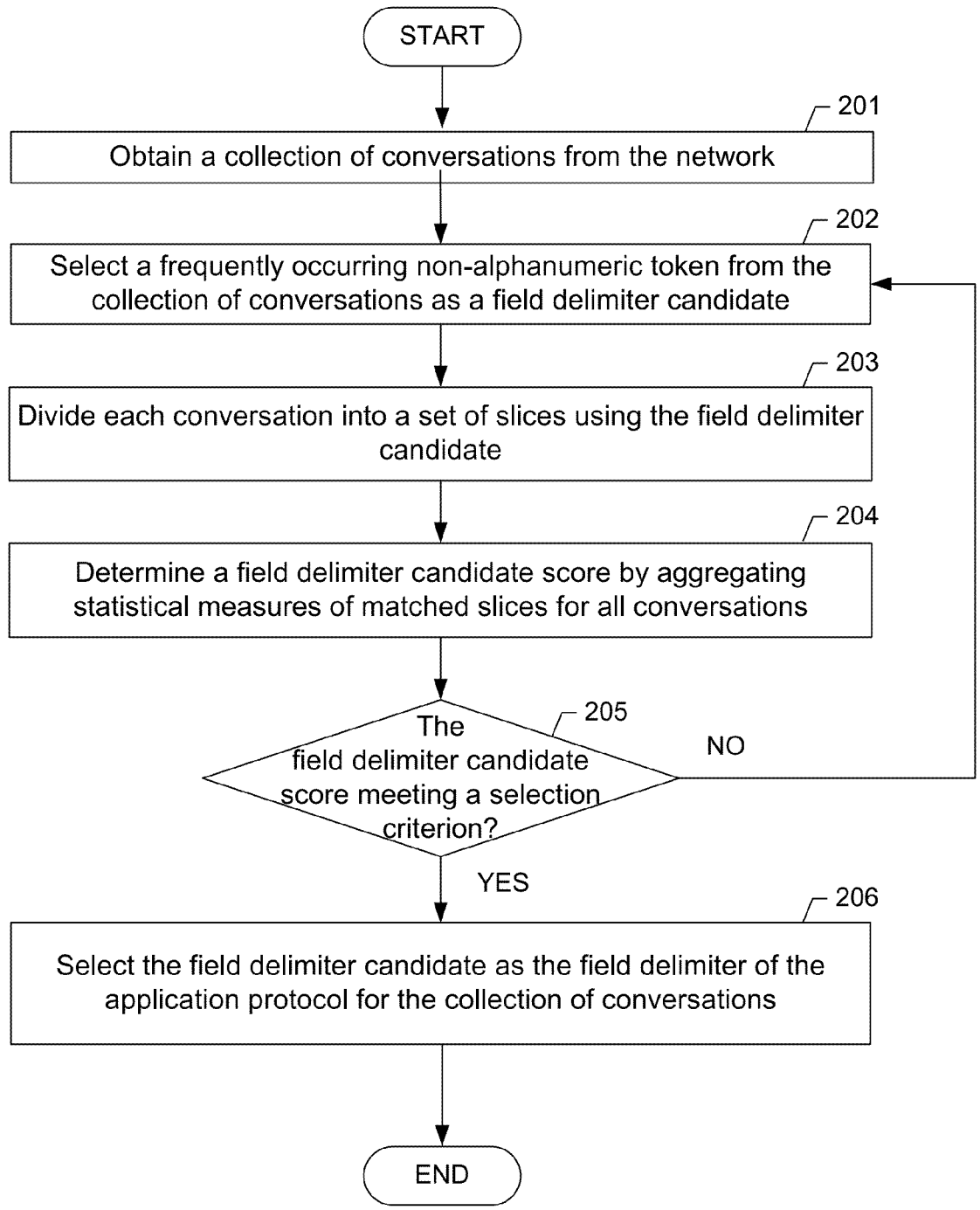
FIG. 2.1

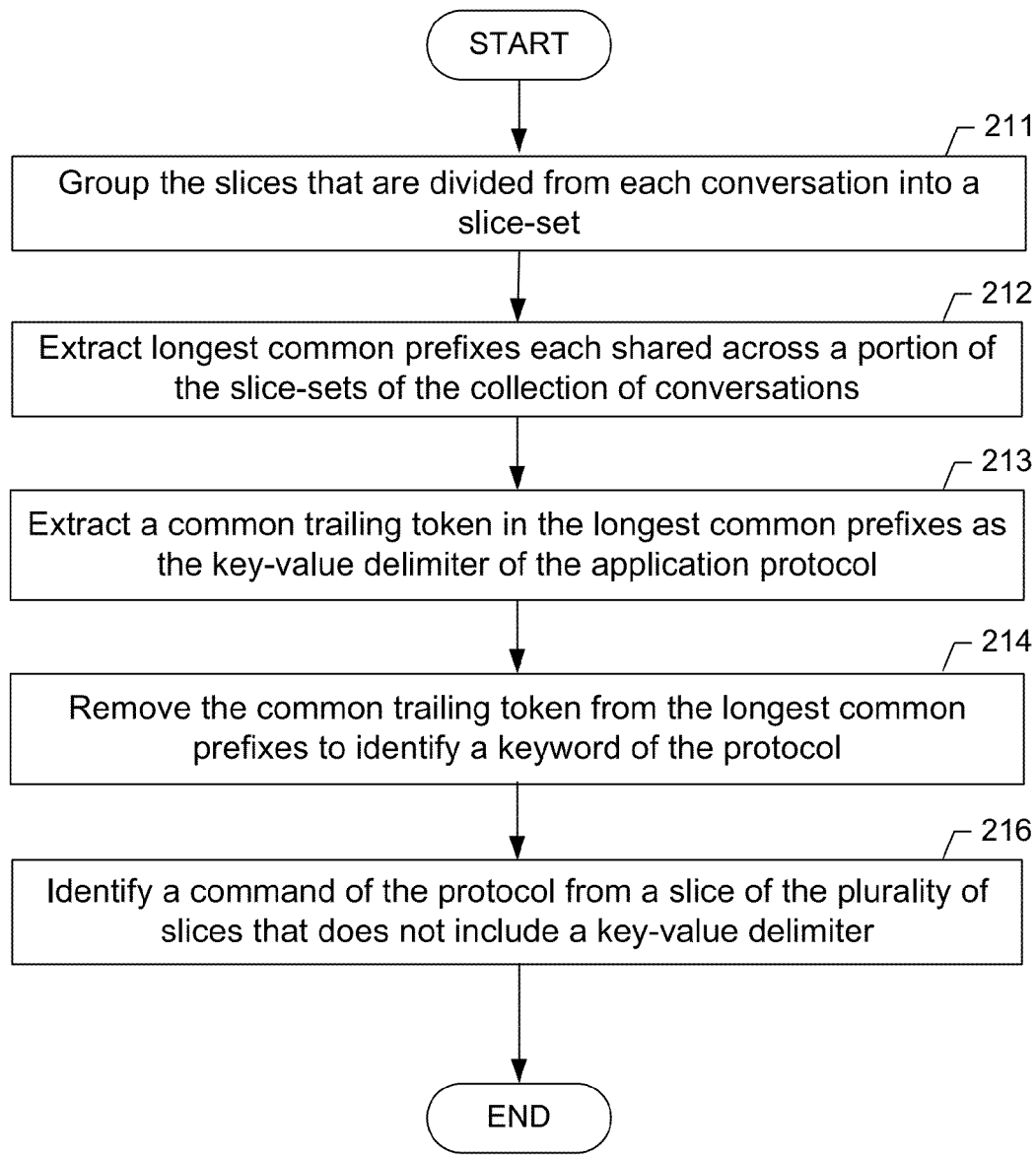
FIG. 2.2

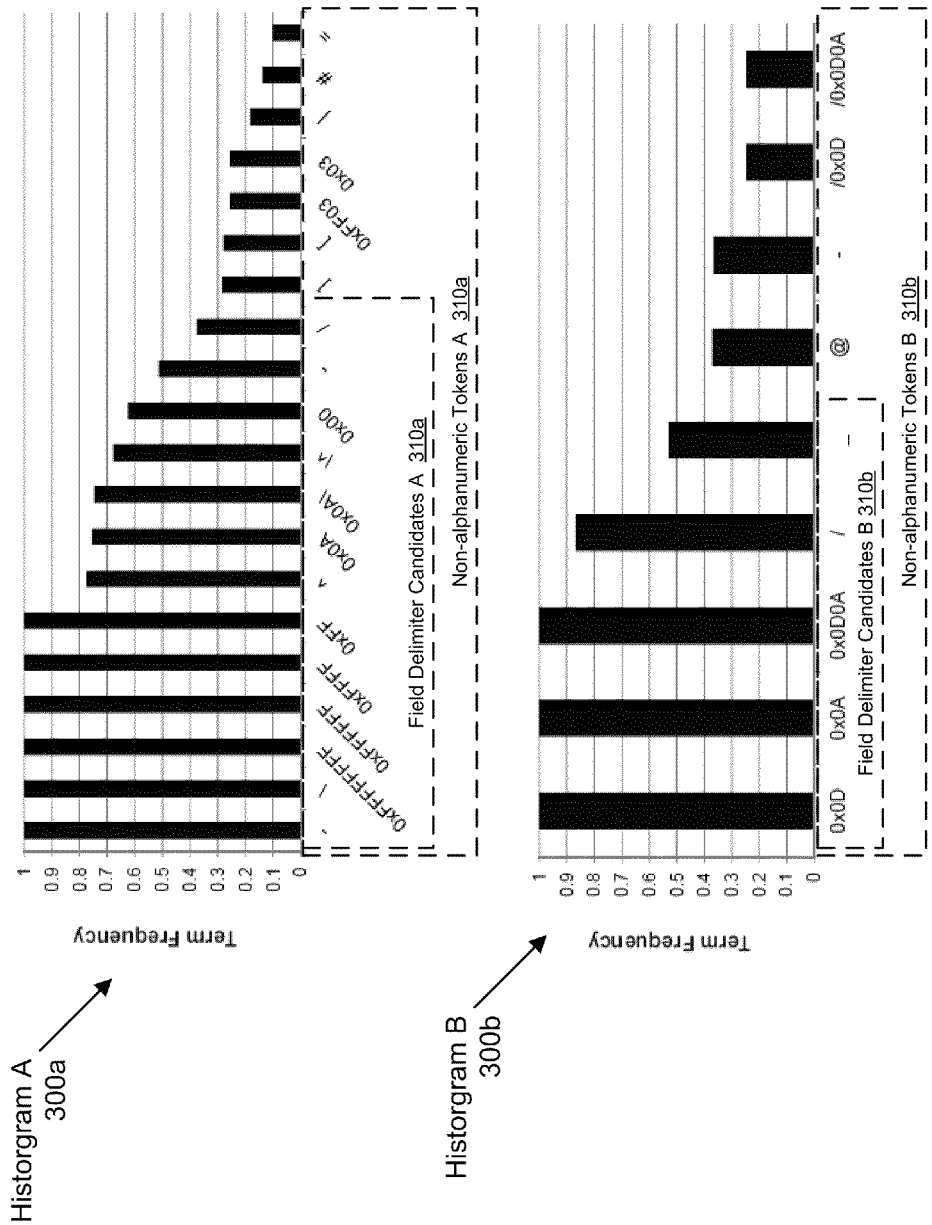
FIG. 3.1

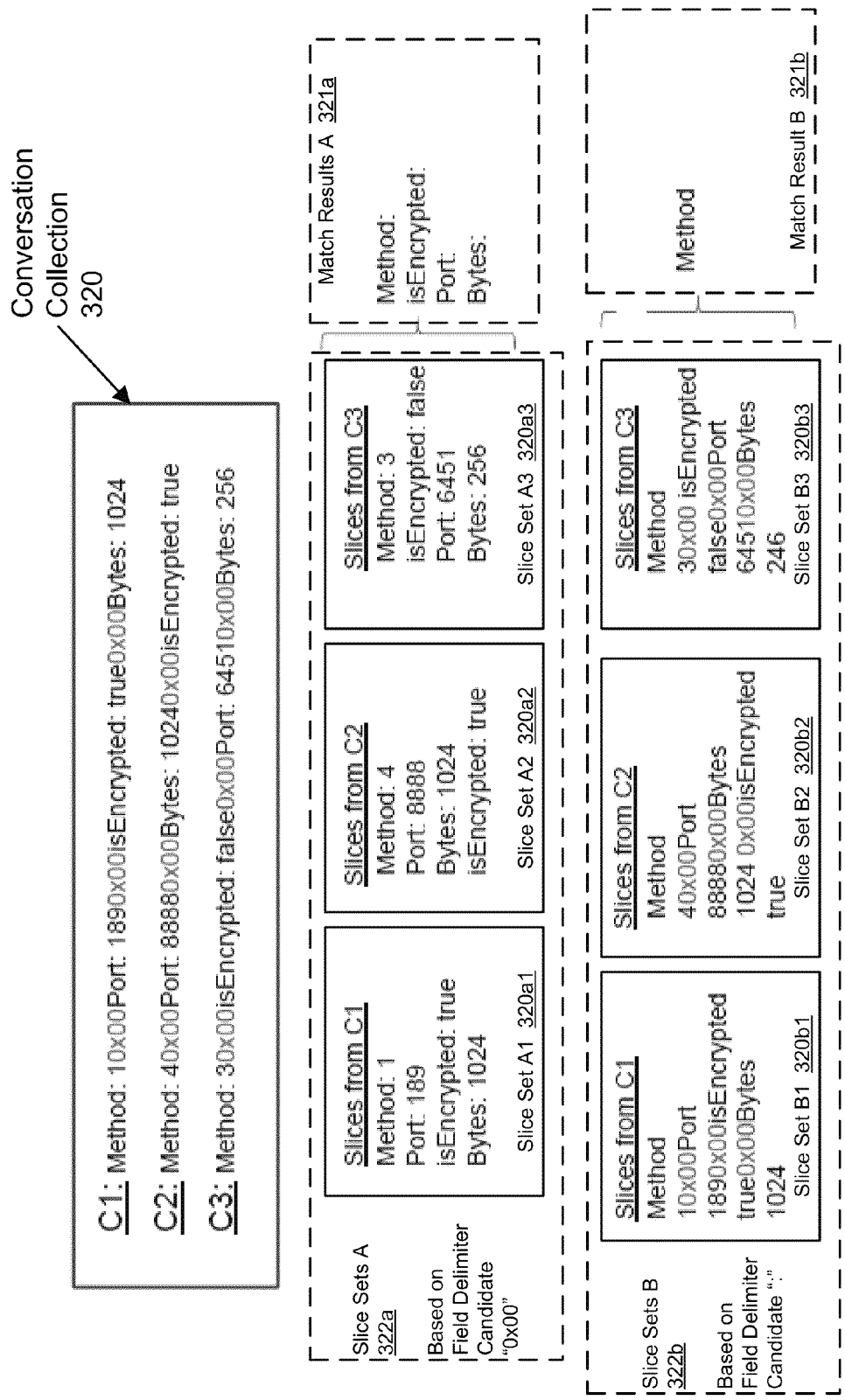
FIG. 3.2

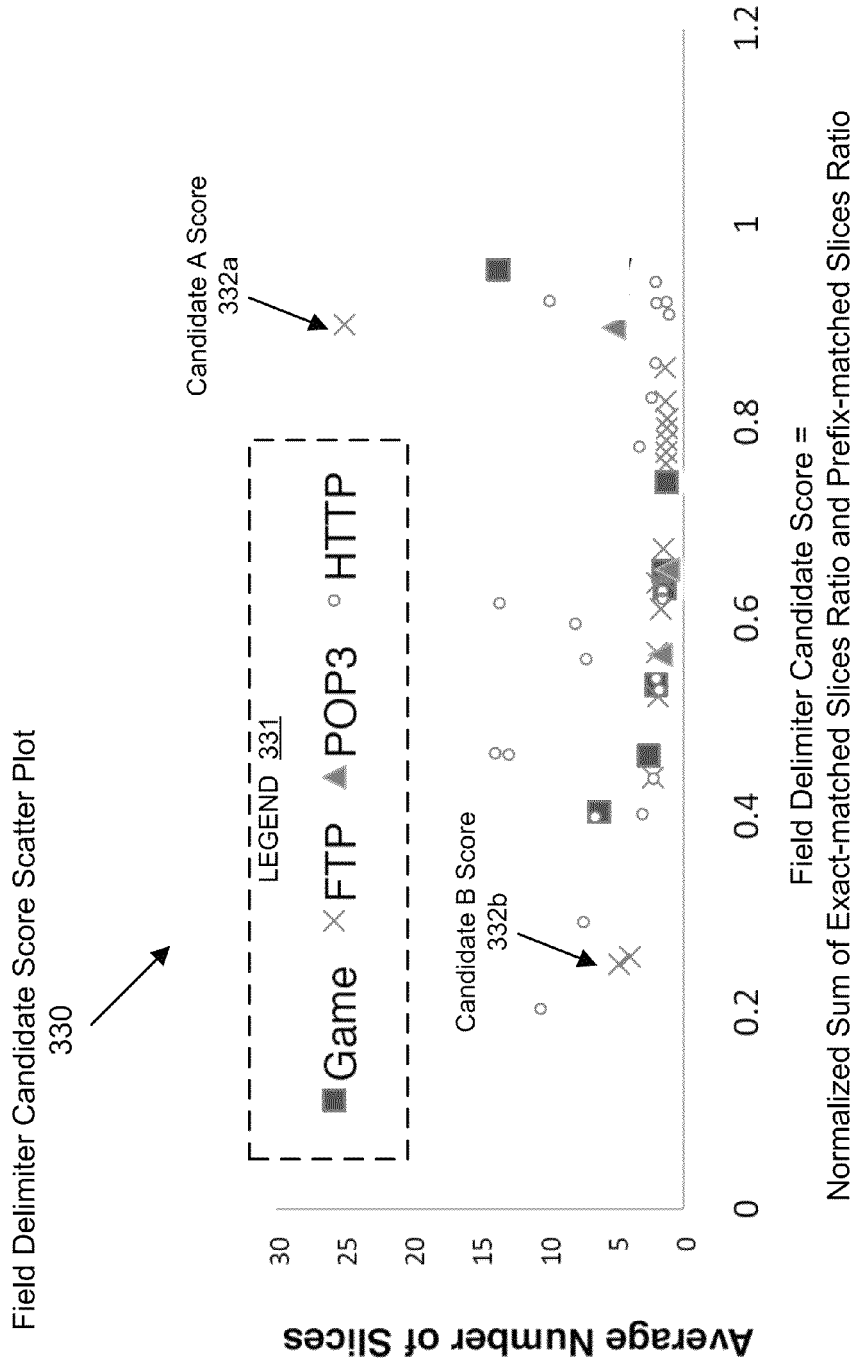
FIG. 3.3

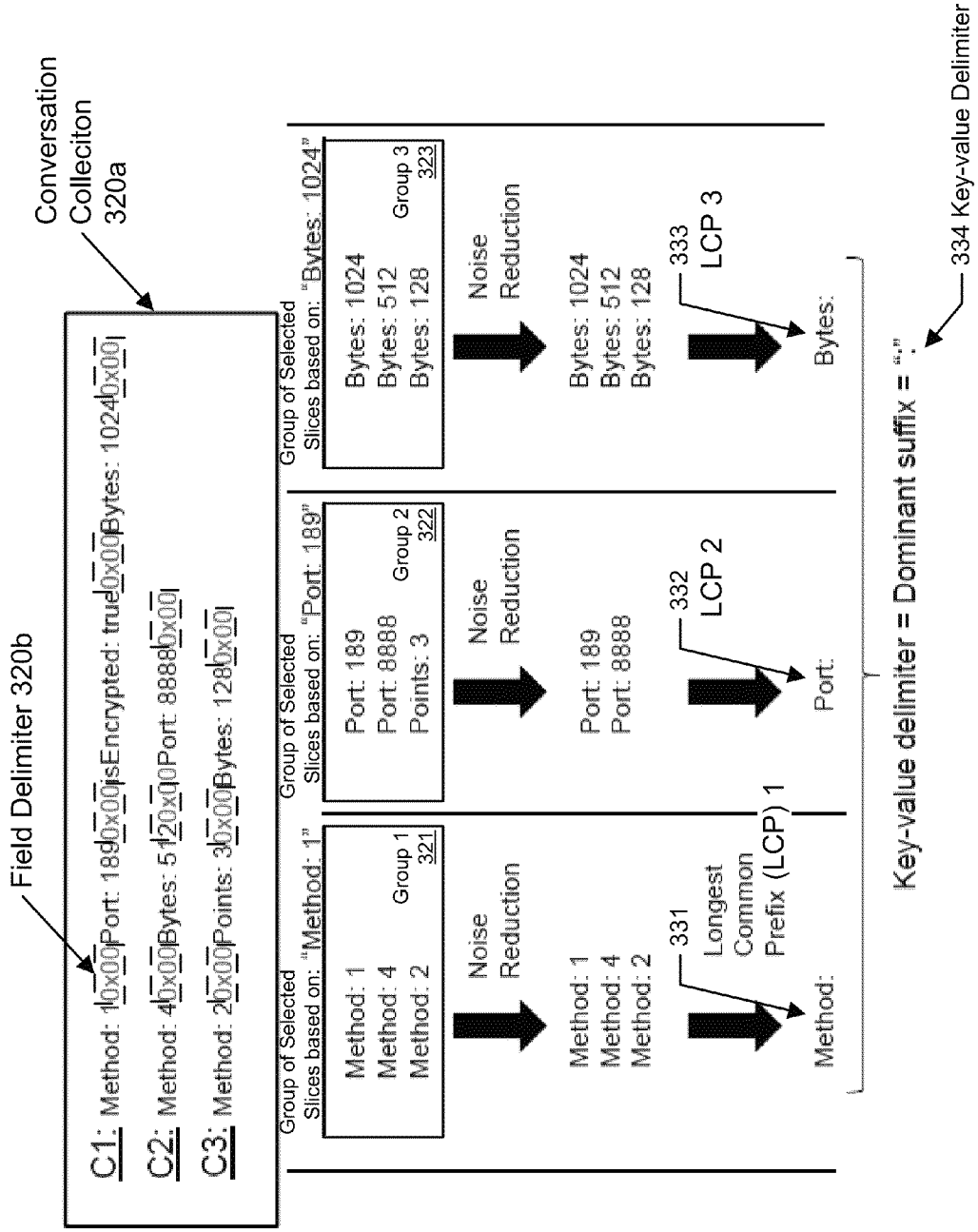
FIG. 3.4

AUTOMATIC PARSING OF TEXT-BASED APPLICATION PROTOCOLS USING NETWORK TRAFFIC DATA

BACKGROUND OF THE INVENTION

Protocols regulate the communication over a network. They specify the syntax, the semantics and timing of messages that have to be exchanged by entities involved in the communication. As such, protocol specifications are fundamental to solve critical parts of network management, traffic analysis and security operations. For example, the knowledge of a protocol allows a network analyst to run traffic classification algorithms, to check for possible malicious attempts to violate a system, or simply to implement applications that use such protocol. Nowadays the number of new applications shows explosive growth in the Internet, most of which use proprietary and undocumented protocols. Online games, chat services, social network applications, novel peer-to-peer applications, or even botnets to name a few are popping out at a constant pace. Those are mostly based on closed design and technologies. This clearly limits the knowledge of protocol specifications, and hampers all mechanisms that leverage such knowledge.

While extracting signatures from the protocol syntax could be partly automated, the automatic reverse engineering of protocol specifications is a much more ambitious task.

SUMMARY

In general, in one aspect, the present invention relates to a method for analyzing a protocol of a network. The method includes obtaining a plurality of conversations from the network, wherein each of the plurality of conversations comprises a sequence of messages exchanged between a server and a client of the network using the protocol, wherein each message of the sequence of messages comprise one or more fields separated by a field delimiter of the protocol, extracting, by a processor of a computer system, a plurality of non-alphanumeric tokens from the plurality of conversations, wherein the plurality of non-alphanumeric tokens comprises a non-alphanumeric token associated with a frequency of occurrence in the plurality of conversations, selecting, based on the frequency of occurrence meeting a pre-determined field delimiter candidate selection criterion, the non-alphanumeric token as a field delimiter candidate, dividing, by the computer processor and using the field delimiter candidate, each of the plurality of conversations into a plurality of slices, analyzing, by the computer processor and using a pre-determined field delimiter candidate scoring algorithm, the plurality of slices to determine a statistical measure of matched slices for each of the plurality of conversations, and determine a field delimiter candidate score by aggregating the statistical measure of matched slices for all of the plurality of conversations, and selecting, by the processor and based on the field delimiter candidate score associated with the non-alphanumeric token, the non-alphanumeric token as the field delimiter of the protocol.

In general, in one aspect, the present invention relates to a system for analyzing a protocol of a network. The system includes an acquisition module configured to obtain a plurality of conversations from the network, wherein each of the plurality of conversations comprises a sequence of messages exchanged between a server and a client of the network using the protocol, wherein each message of the sequence of messages comprise one or more fields separated by a field delimiter of the protocol, a field delimiter extractor executing on a processor of a computer system and configured to extract a plurality of non-alphanumeric tokens from the plurality of conversations, wherein the plurality of non-alphanumeric tokens comprises a non-alphanumeric token associated with a frequency of occurrence in the plurality of conversations, select, based on the frequency of occurrence meeting a predetermined field delimiter candidate selection criterion, the non-alphanumeric token as a field delimiter candidate of a plurality of field delimiter candidates, divide, using the field delimiter candidate, each of the plurality of conversations into a plurality of slices, analyze, using a pre-determined field delimiter candidate scoring algorithm, the plurality of slices to determine a statistical measure of matched slices for each of the plurality of conversations, and determine a field delimiter candidate score by aggregating the statistical measure of matched slices for all of the plurality of conversations, and select, based on the field delimiter candidate score associated with the non-alphanumeric token, the non-alphanumeric token from the plurality of field delimiter candidates as the field delimiter of the protocol, and a repository configured to store the plurality of conversations, the plurality of non-alphanumeric tokens, and the plurality of field delimiter candidates.

In general, in one aspect, the present invention relates to a non-transitory computer readable medium embodying instructions for analyzing a protocol of a network. The instructions when executed by a processor comprising functionality for obtaining a plurality of conversations from the network, wherein each of the plurality of conversations comprises a sequence of messages exchanged between a server and a client of the network using the protocol, wherein each message of the sequence of messages comprise one or more fields separated by a field delimiter of the protocol, extracting a plurality of non-alphanumeric tokens from the plurality of conversations, wherein the plurality of non-alphanumeric tokens comprises a non-alphanumeric token associated with a frequency of occurrence in the plurality of conversations, selecting, based on the frequency of occurrence meeting a pre-determined field delimiter candidate selection criterion, the non-alphanumeric token as a field delimiter candidate, dividing, using the field delimiter candidate, each of the plurality of conversations into a plurality of slices, analyzing, using a pre-determined field delimiter candidate scoring algorithm, the plurality of slices to determine a statistical measure of matched slices for each of the plurality of conversations, and determine a field delimiter candidate score by aggregating the statistical measure of matched slices for all of the plurality of conversations, and selecting, based on the field delimiter candidate score associated with the non-alphanumeric token, the non-alphanumeric token as the field delimiter of the protocol.

BRIEF DESCRIPTION OF DRAWINGS

FIG. 1.1 shows a system block diagram according to aspects of the invention.

FIGS. 1.2-1.3 show example bi-directional flows and conversation collections according to aspects of the invention.

FIGS. 2.1 and 2.2 show flowcharts of a method according to aspects of the invention.

FIGS. 3.1-3.4 show various examples according to aspects of the invention.

DETAILED DESCRIPTION

Figure 4:
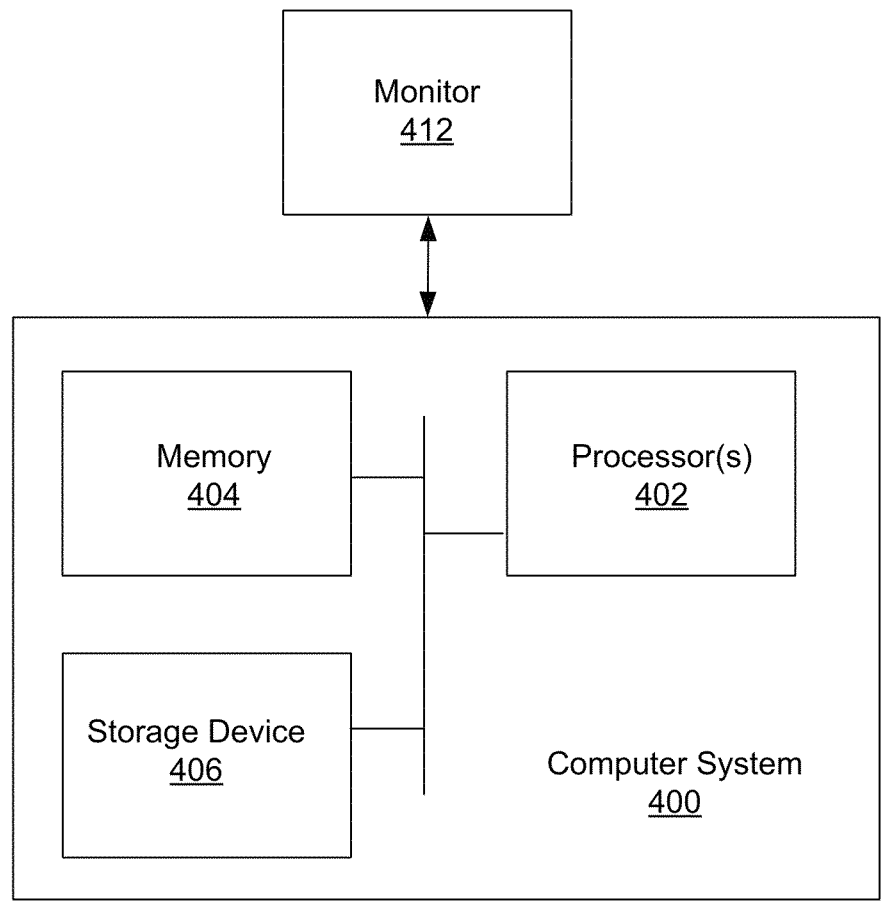
FIG. 4 shows a computer system according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

The web (or "World Wide Web") is a system of interlinked hypertext documents (i.e., web pages) accessed via the Internet using URLs (i.e., Universal Resource Locators) and IP-addresses. The Internet is composed of machines (e.g., computers or other devices with Internet access) associated with IP-addresses for identifying and communicating with each other on the Internet. The Internet, URL, and IP-addresses are well known to those skilled in the art. The machines composing the Internet are called endpoints on the Internet. Internet endpoints may act as a server, a client, or a peer in the communication activity on the Internet. The endpoints may also be referred to as hosts (e.g., network hosts or Internet hosts) that host information as well as client and/or server software. Network nodes such as modems, printers, routers, and switches may not be considered as hosts.

Generally, a flow (or traffic stream) between two network hosts is a series of data records that form messages for the communication between the two network hosts engaged in an Internet transaction. The Internet transaction may be related to completing a task, which may be legitimate or malicious. The communication between the two network hosts is referred to as a conversation. Each packet includes a block of data (i.e., actual packet content, referred to as payload) and supplemental data (referred to as header) containing information regarding the payload. Each flow is referred to as attached to each of the two hosts and is uniquely defined by a 5-tuple identifier (i.e., source address, destination address, source port, destination port, and transport protocol). Specifically, each packet in a flow includes, in its header, the 5-tuple identifier of the flow. Throughout this disclosure, the terms "traffic flow", "flow", "traffic stream" and "stream" are used interchangeably and may refer to a complete flow or any portion thereof depending on the context unless explicitly stated otherwise. Further, the terms "conversation" and "bi-directional flow" are used interchangeably unless explicitly stated otherwise.

A protocol, or communications protocol is a system of digital message formats and rules for exchanging those messages in or between computing systems and in telecommunications. Typically, a protocol defines the syntax, semantics, and synchronization of communication, such that each message has an exact meaning intended to provoke a particular response of the receiver. Protocols may be layered in a computer network. For example, the term "transport protocol" refers to a protocol associated with or based on top of a transport layer of the Internet. The transport protocol may be referred to as layer-four protocol, and includes TCP, UDP, etc. In another example, the term "application protocol" refers to a protocol associated with or based on top of an application layer of the Internet. The application protocol may be referred to as layer-seven protocol. HTTP (HyperText Transfer Protocol), SMTP (Simple Mail Transfer Protocol), IRC (Internet relay chat), and FTP (File Transfer Protocol) are examples of documented and published application protocols. As noted above, many Internet application protocols are proprietary and undocumented protocols.

Embodiments of the invention provide a method and system for analyzing a text based application protocol to extract and identify various delimiters, keywords, and commands of the application protocol. In one or more embodiments, the text based application protocol being analyzed is a proprietary and/or undocumented protocol. In one or more embodiments, the proprietary and/or undocumented application protocol is based on the transport protocol of TCP and/or UDP.

FIG. 1.1 shows a system block diagram of a system (100) in accordance with one or more embodiments of the invention. Those skilled in the art, having the benefit of this detailed description, will appreciate the components shown in FIG. 1.1 may differ among embodiments of the invention, and that one or more of the components may be optional. Although specific numbers of components are shown in FIG. 1.1, different number of each component may be included. In one or more embodiments of the invention, one or more of the components shown in FIG. 1.1 may be omitted, repeated, supplemented, and/or otherwise modified from that shown in FIG. 1.1. Accordingly, the specific arrangement of components shown in FIG. 1.1 should not be construed as limiting the scope of the invention.

As shown in FIG. 1.1, the system (100) includes a protocol analysis tool (120), a user system (140), and a computer network (110). The protocol analysis tool (120) includes data repository (127), application interface (121), acquisition module (122), field delimiter extractor (123), key-value delimiter extractor (124), keyword extractor (125), and command extractor (126). The user system (140) includes a processor (141), a user interface (142), and a display unit (143). The computer network (110) may include wired and/or wireless portions of the Internet and/or other data communications networks such as wide area networks (WANs), local area networks (LANs), etc. Further, the computer network (110) includes network nodes (e.g., server node (112), client node (113), data collectors (114), etc.), which are devices configured with computing and communication capabilities for executing applications in the computer network (110). In particular, the data collectors (114) are special type of nodes executing data collection applications.

As shown in FIG. 1.1, the server node (112) and client node (113) communicate with each other by exchanging data packets forming a bi-directional flow (111), which includes two uni-directional flows (111a) and (111b) represented by two arrows. In one or more embodiments, the server node (112) and the client node (113) exchange data packets in the bi-directional flow (111) as a result of an application executing on the server node (112) and the client node (113). In this context, the bi-directional flow (111) may be referred to as a conversation between the server node (112) and client node (113). Examples of the application include network applications, such as HTTP, SMPT, game applications, chat applications, etc.

In one or more embodiments, certain device(s) (e.g., data collectors (114)) within the computer network (110) may be configured to collect network data (e.g., bi-directional flow (111), among other traffic flows) for providing to the protocol analysis tool (120). Each of these components is described below. One of ordinary skill in the art will appreciate that embodiments are not limited to the configuration shown in FIG. 1.1.

In one or more embodiments of the invention, the protocol analysis tool (120) is configured to interact with the computer network (110) using one or more of the application interface (121). The application interface (121) may be configured to receive data (e.g., bi-directional flow (111)) from the computer network (110) and/or store received data to the data repository (127). Such network data captured over a time period (e.g., an hour, a day, a week, etc.) is referred to as trace or network trace. Network trace contains network traffic data related to communications between nodes in the computer network (110). For example, the network trace may be captured on a routine basis using the data collectors (114) and selectively sent to the application interface (121) from time to time to be formatted and stored in the repository (127) for analysis. For example, the data collectors (114) may be a packet analyzer, network analyze, protocol analyzer, sniffer, netflow device, semantic traffic analyzer (STA), or other types of data collection device that intercept and log data traffic passing over the computer network (110) or a portion thereof. In one or more embodiments, the data collectors (114) may be deployed in the computer network (110) by a network communication service provider (e.g., ISP), a network security service provider, or other business or government entities. The data collector (114) may be configured to capture and provide network trace to the application interface (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the protocol analysis tool (120).

In one or more embodiments, the user system (140) is configured to interact with an analyst user using the user interface (142). The user interface (142) may be configured to receive data and/or instruction(s) from the analyst user. The user interface (142) may also be configured to deliver information (e.g., a report or an alert) to the analyst user. In addition, the user interface (142) may be configured to send data and/or instruction(s) to, and receive data and/or information from, the protocol analysis tool (120). The analyst user may include, but is not limited to, an individual, a group, an organization, or some other entity having authority and/or responsibility to access the protocol analysis tool (120). Specifically, the context of the term "analyst user" here is distinct from that of a user of the computer network (110). The user system (140) may be, or may contain a form of, an internet-based communication device that is capable of communicating with the application interface (121) of the protocol analysis tool (120). Alternatively, the protocol analysis tool (120) may be part of the user system (140). The user system (140) may correspond to, but is not limited to, a workstation, a desktop computer, a laptop computer, or other user computing device.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the protocol analysis tool (120) (e.g., report, alert, etc.).

As shown, communication links are provided between the protocol analysis tool (120), the computer network (110), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired and wireless. In one or more embodiments, the protocol analysis tool (120), the user system (140), and the communication links may be part of the computer network (110).

In one or more embodiments, a central processing unit (CPU, not shown) of the protocol analysis tool (120) is configured to execute instructions to operate the components of the protocol analysis tool (120). In one or more embodiments, the memory (not shown) of the protocol analysis tool (120) is configured to store software instructions for analyzing the network trace to extract features (e.g., messages, slices, delimiters, keywords, commands, etc.) for analyzing the protocols used in the flows. The memory may be one of a variety of memory devices, including but not limited to random access memory (RAM), read-only memory (ROM), cache memory, and flash memory. The memory may be further configured to serve as back-up storage for information stored in the data repository (127).

The protocol analysis tool (120) may include one or more system computers, which may be implemented as a server or any conventional computing system having a hardware processor. However, those skilled in the art will appreciate that implementations of various technologies described herein may be practiced in many different computer system configurations, including multiprocessor systems, hand-held devices, networked personal computers, minicomputers, mainframe computers, and the like.

In one or more embodiments, the protocol analysis tool (120) is configured to obtain and store data in the data repository (127). In one or more embodiments, the data repository (127) is a persistent storage device (or set of devices) and is configured to receive data from the computer network (110) using the application interface (121). The data repository (127) is also configured to deliver working data to, and receive working data from, the acquisition module (122), field delimiter extractor (123), key-value delimiter extractor (124), and command extractor (126). As shown in FIG. 1.1, the data repository (127) stores multiple collections of conversations with associated non-alphanumeric tokens and slice-sets. For example, the conversion collection (131a) includes the conversion (131) that is associated with the non-alphanumeric tokens (132) and the slice-set (133). In particular, all conversations in the conversion collection (131a) are generated based on the same application protocol. The data repository (127) may be a data store (e.g., a database, a file system, one or more data structures configured in a memory, some other medium for storing data, or any suitable combination thereof), which may include information (e.g., conversation (131), etc.) related to the network protocol analysis. The data repository (127) may be a device internal to the protocol analysis tool (120). Alternatively, the data repository (127) may be an external storage device operatively connected to the protocol analysis tool (120).

In one or more embodiments, the protocol analysis tool (120) is configured to interact with the user system (140) using the application interface (121). The application interface (121) may be configured to receive data and/or instruction(s) from the user system (140). The application interface (121) may also be configured to deliver information and/or instruction(s) to the user system (140). In one or more embodiments, the protocol analysis tool (120) is configured to support various data formats provided by the user system (140).

In one or more embodiments, the protocol analysis tool (120) includes the acquisition module (122) that is configured to obtain a network trace from the computer network (110), for example via data collectors (114). In one or more embodiments, the acquisition module (122) works in conjunction with the data collectors (114) to parse data packets and collate data packets belonging to the same flow tuple (i.e., the aforementioned 5-tuple) to form the network trace. For example, such network trace, or information extracted therefrom, may then be stored in the repository (127) as the conversion (131), etc.

In one or more embodiments, a flow parser (e.g., acquisition module (122) in conjunction with data collectors (114) in FIG. 1.1) reconstructs (e.g., eliminates redundant packets, collates packets into a correct sequence, etc.) all the packets that correspond to the same traffic flow (e.g., uni-directional flows (111a), (111b)) identified by the aforementioned 5-tuple. In one or more embodiments, the flows are captured and parsed throughout a pre-configured time interval recurring on a periodic basis (e.g., every minute, hourly, daily, etc.) or triggered in response to an event. In one or more embodiments, the captured flows are stored in the repository (127) as conversations. For example, the bi-directional flow (111) may be generated by a particular network application executing on the server node (112) and the client node (113). The bi-directional flow (111) is captured and stored as the conversation (131). Specifically, the conversation (131) includes the sequence of messages embedded in the bi-directional flow (111) that are exchanged between the server node (112) and the client node (113) using the application protocol of this particular network application. In addition, each message includes one or more fields separated by a field delimiter of this application protocol. In one or more embodiments, the conversation (131) is stored in the repository (129) as part of a conversation collection (131a). Specifically, all conversations in the conversation collection (131a) are based on the same protocol to be analyzed by the protocol analysis tool (120). In one or more embodiments, all conversations in the conversation collection (131a) are generated by the same application using the same protocol. In addition, all conversations in the conversation collection (131a) may further be generated by the same application in such a manner to include same type of messages in each and every conversation. Further, multiple conversation collections may be stored in the repository (129), corresponding to multiple protocols to be analyzed by the protocol analysis tool (120). Each of these conversation collections may be created by using test-bed in which a target application is executed while traffic exchanged is being captured. Alternatively, a conversation collection can be extracted from passive observation of actual traffic by the mean of classifiers, e.g., by filtering all conversation involving a well-known port, or by relying on a Deep Packet Inspection (DPI) classifier.

FIG. 1.2 shows an example of the bi-directional flow (111) that includes a series of messages exchanged between the server node (112) and the client node (113) shown in FIG. 1.1. As shown, the vertical downward pointing arrows represent progression of time, along which data packets are exchanged between the client and the server. In particular, data packets sent from the client to the server (C-S) are labeled "CS packet" while data packets sent from the server to the client (S-C) are labeled "SC packet". Accordingly, the series of data communication exchanges between the server and the client includes CS packet (151), CS packet (152), SC packet (161), CS packet (153), CS packet (154), SC packet (162), etc. In one or more embodiments, the series of data communication are layer-seven (i.e., application layer) communications generated by the network application, which is a layer-seven application. In one or more embodiments, the uni-directional packets in-between direction changes form a uni-directional message. For example, CS packet (151) and CS packet (152) form a CS message (i.e., message A (172a)), SC packet (162) forms a SC message (i.e., message B (172b)), etc. In one or more embodiments, the message A (172a) and message B (172b) are application level messages, also referred to as application messages or layer seven messages, while the various packets included therein are layer four packets.

FIG. 1.3 shows an example of conversations (i.e., conversation collections (170)) stored in the repository (127), as shown in FIG. 1.1 above. As shown in FIG. 1.3, the conversation collections (170) includes protocol X conversation collection (171), protocol Y conversation collection (172), and protocol Z conversation collection (173). As noted above, each of these collections may be created by using test-bed in which a target application is executed while traffic exchanged is being captured. Alternatively, a collection can be extracted from passive observation of actual traffic by the mean of classifiers, e.g., by filtering all conversation involving a well-known port, or by relying on a Deep Packet Inspection (DPI) classifier.

In one or more embodiments, the protocol X conversation collection (171) is generated by a network application based on a proprietary text-based protocol (i.e., protocol X), and includes conversation 1 (171a), conversation 2 (171b), conversation K (171k), etc. represented along the vertical direction. In particular, the protocol X conversation collection (171) and conversation 1 (171a) are essentially the same as the conversation collection (131a) and conversation (131), respectively, shown in FIG. 1.1 above. Further as shown in FIG. 1.3, the conversation 1 (171a) includes client-to-server messages and server-to-client messages along the horizontal direction representing time. For example, the client-to-server messages and server-to-client messages includes the message A (172a) and message B (172b), respectively, shown in FIG. 1.2 above.

In one or more embodiments, the application protocol X is based on the transport protocol UDP. In such embodiments, a single application message is carried into a UDP segment payload over a single IP datagram where de-fragmentation may be performed by the acquisition module (122) described in reference to FIG. 1.1 above. In one or more embodiments, the application protocol X is based on the transport protocol TCP. In such embodiments, a message ends when by a packet with the TCP PUSH flag set. Because a single application-level PDU can spread over multiple IP datagrams in TCP, TCP packet reassembly may be performed by the acquisition module (122) described in reference to FIG. 1.1 above.

Further as shown in FIG. 1.3, the conversation K (171k) includes the message C (172c) that further includes fields denoted as F1, F2, F3, etc. For example, the field F2 (173) included in the message C (172c) may include further attribute structures. In one or more embodiments, the fields in the messages (e.g., message C (172c)) are separated (i.e., delimited) using field delimiters. In addition, each field may include a pair of keyword and value (i.e., key-value pair) that are further separated (i.e., delimited) using a key-value delimiter. Other field that does not include any key-value pair may be a singleton keyword representing a command, such as the QUIT command in FTP. TABLE 1 shows example field delimiters and key-value delimiters for various application protocols. For example, the field delimiter 0x0D0A corresponds to carriage-return and line-feed, and the field delimiter 0x00 corresponds to null. Generally, these delimiters are non-alphanumeric sequence of one or more (e.g., 1, 2, etc.) characters that occur frequently in both horizontal and high vertical directions in the protocol X conversation collection (171).

TABLE 1

| Prot. | Field Delim. | KV Delim. |
|---|---|---|
| HTTP | 0x0D0A | ":", " " |
| SMTP | 0x0D0A | ":", " ", "-" |
| POP3 | 0x0D0A | ":", " " |
| RTSP | 0x0D0A | ":" |
| SIP | 0x0D0A | ":", " " |
| TF | 0x00 | 0x00 |
| TEL | 0x0D0A | ":", " " |
| FTP | 0x0D0A | " " |
| TFTP | 0x1D | 0x1E |
| CS | 0x5C | 0x5C |
| GNU | 0x0D0A | ":", " " |
| RTP | 0x0D0A | ":", " " |
| MSN | 0x0D0A | " " |

Returning to the discussion of FIG. 1.1, in one or more embodiments, the protocol analysis tool (120) includes the field delimiter extractor (123) that is configured to extract non-alphanumeric tokens from the conversations stored in the repository (127). For example, the non-alphanumeric tokens (132) are extracted from the conversation (131). Once extracted, a frequency of occurrence of each non-alphanumeric token is calculated to select one or more field delimiter candidate based on a pre-determined field delimiter candidate selection criterion. In one or more embodiments, a non-alphanumeric token is selected as the field delimiter candidate (132a) if the frequency of occurrence of this non-alphanumeric token throughout the conversation (131) exceeds a pre-determined threshold. In one or more embodiments, a non-alphanumeric token is selected as the field delimiter candidate (132a) if this non-alphanumeric token is among a pre-determined number of most frequently occurring non-alphanumeric tokens throughout the conversation (131). In one or more embodiments, the frequency of occurrence of each non-alphanumeric token is calculated based on multiple conversations (e.g., the protocol X conversation collection (171)) shown in FIG. 1.3) of the same application protocol, instead of the single conversation (131), for applying to the pre-determined field delimiter candidate selection criterion.

Continuing with the discussion of FIG. 1.1, in one or more embodiments, the field delimiter extractor (123) is further configured to divide, using the field delimiter candidate (e.g., the field delimiter candidate (132a)), each of the conversations into a number of slices forming a slice-set for each conversation. For example, the field delimiter candidate (132a) may be used to divide the conversation (131) into slices (e.g., slice (133a)) in the slice-set (133). Although the conversation (131) is shown in FIG. 1.1 to be associated with only one slice-set (133), there are typically multiple slice-sets each generated using one of several field delimiter candidates (e.g., the field delimiter candidate (132a)) of the conversation (131). In one or more embodiments, the slice-sets of all conversations in a conversation collection are analyzed to select, from all field delimiter candidates (e.g., the field delimiter candidate (132a)), the field delimiter for the application protocol of the conversation collection. Details of analyzing the slice-sets to select the field delimiter are described in reference to FIGS. 2.1 and 3.1-3.3 below.

Continuing with the discussion of FIG. 1.1, in one or more embodiments, the protocol analysis tool (120) includes the key-value delimiter extractor (124) that is configured to analyze a slice-set generated using the selected field delimiter for extracting the key-value delimiter. For example, the field delimiter candidate (132a) may be selected as the field delimiter for the application protocol of the conversation (131), which is divided into the slice-set (133) using the selected field delimiter. In other words, the slice-set (133) represents the set of fields in the conversation (131) according to the application protocol. As noted above, a portion of the set of fields may include key-value pairs, while the remainder portion includes commands. The key-value delimiter extractor (124) then analyze all sets of fields for all conversations in the conversation collection (131a) to extract the key-value delimiter of the application protocol for the conversation collection (131a). Details of analyzing the sets of fields to extract the key-value delimiter are described in reference to FIGS. 2.2 and 3.4 below.

Continuing with the discussion of FIG. 1.1, in one or more embodiments, the protocol analysis tool (120) includes the keyword extractor (125) that is configured to identify a keyword of the application protocol. In one or more embodiments, the protocol analysis tool (120) includes the command extractor (126) that is configured to identify a command of the application protocol. Details of identify the keyword and the command are described in reference to FIG. 2.2 below.

FIGS. 2.1 and 2.2 depict flowcharts of a method in accordance with one or more embodiments of the invention. In one or more embodiments of the invention, one or more of the steps shown in FIGS. 2.1 and 2.2 may be omitted, repeated, and/or performed in a different order. Accordingly, embodiments of the invention should not be considered limited to the specific arrangements of steps shown in FIGS. 2.1 and 2.2. In one or more embodiments of the invention, the method depicted in FIG. 2 may be practiced using system (100) described with respect to FIG. 1.1 above.

FIG. 2.1 depicts a flowchart of a method to extract a field delimiter from conversations generated based on an application protocol of a computer network.

Initially, in Step 201, a collection of conversations is obtained from the computer network. Specifically, each conversation includes a sequence of messages exchanged between a server and a client of the computer network using the application protocol. In addition, each message includes one or more fields separated by a field delimiter of the application protocol. In one or more embodiments, the conversation and messages are those described in reference to FIGS. 1.2 and 1.3 above.

In Step 202, a frequently occurring non-alphanumeric token is selected from the collection of conversations as a field delimiter candidate. In one or more embodiments, the frequently occurring non-alphanumeric token and the field delimiter candidate are selected using the algorithm described in reference to the field delimiter extractor (123) shown in FIG. 1.1 above. An example of selecting the frequently occurring non-alphanumeric token and the field delimiter candidate is described in reference to FIG. 3.1 below.

In Step 203, each conversation is divided into a number of slices using the field delimiter candidate. These slices form a slice-set of the conversation. An example of dividing conversations into slice-sets is described in reference to FIG. 3.2 below.

In Step 204, a field delimiter candidate score is determined by aggregating statistical measure of matched slices for all conversations using a pre-determined field delimiter candidate scoring algorithm. In one or more embodiments, the statistical measure of matched slices includes an exact-matched-slices percentage and a prefix-matched-slices percentage that are normalized based on an average number of slices per conversation. Details of the exact-matched-slices percentage and a prefix-matched-slices percentage, and normalizing thereof, are described in reference to FIG. 3.3 below.

In Step 205, a determination is made as to whether the field delimiter candidate score meets a pre-determined field delimiter selection criterion. For example, the pre-determined field delimiter selection criterion may require the field delimiter candidate score to be the highest among all field delimiter candidates.

If the determination in Step 205 is negative, that is, the field delimiter candidate score does not satisfy the pre-determined field delimiter selection criterion, the method returns to Step 202, where a different frequently occurring non-alphanumeric token is selected from the collection of conversations as another field delimiter candidate to go through the iteration of Steps 202 through 205 again.

If the determination in Step 205 is positive, that is, the field delimiter candidate score satisfies the pre-determined field delimiter selection criterion, the method proceeds to Step 206, where the field delimiter candidate is selected as the field delimiter of the application protocol of the collection of conversations.

Although the iteration loop of Steps 202 through 205 are shown as a series of multiple decision iterations, the decision/determination in Step 205 may be performed in parallel for all field delimiter candidates. For example, the pre-determined field delimiter selection criterion may be based on the highest field delimiter candidate score. In this example, the field delimiter candidate scores may be calculated for all field delimiter candidates before the field delimiter candidate scores are compared to select the field delimiter candidate having the highest score.

FIG. 2.2 depicts a flowchart of a method to extract a key-value delimiter based on the result generated from the flowchart shown in FIG. 2.1 above.

Initially in Step 211, slices that are divided from each conversation using the field delimiter are grouped into a slice-set for the conversation. These slices are essentially the fields of the conversation based on the application protocol. Throughout the discussion of FIG. 2.2, the terms "slice" and "field" are synonymous. Examples of slice-sets for conversations in a collection of conversations are described in reference to FIG. 3.2 below.

In Step 212, based on a pre-determined key-value delimiter selection criterion, longest common prefixes (LCPs) are extracted where each LCP is shared across at least a portion of the slice-sets. In one or more embodiments, each slice in a conversation is used as a seed to generate a group of selected slices from other conversations in the conversation collection. Specifically, the seeding slice and each selected slice share a common prefix having a length meeting a pre-determined criterion. Examples of groups of selected slices based on various common prefixes are shown in FIG. 3.4 below. Among these common prefixes, one or more LCPs are selected.

In Step 213, a common trailing token (or common suffix) is extracted from these selected LCPs as the key-value delimiter of the protocol. An example is shown in FIG. 3.4 below.

In Step 214, the key-value delimiter is removed from each LCP to identify a keyword of the application protocol. Further, as noted above, a field that does not include any key-value pair is considered as a command field. In Step 215, a command of the application protocol is identified from a slice that does not include a key-value delimiter.

FIGS. 3.1-3.4 show an example for analyzing a text-based protocol in accordance with embodiments of the invention. In particular, the example is based on the schematic diagrams and the method flow charts shown in FIG. 1.1 through FIG. 2.2 above.

FIG. 3.1 shows an example of frequently occurring non-alphanumeric tokens in conversation collections. In particular, FIG. 3.1 shows a histogram of non-alphanumeric tokens A (310a) and a histogram of non-alphanumeric tokens B (310b). Specifically, the histogram of non-alphanumeric tokens A (310a) shows the frequency of occurrence of various non-alphanumeric tokens tallied from conversations based on an Internet game protocol, and the histogram of non-alphanumeric tokens B (31ba) shows the frequency of occurrence of various non-alphanumeric tokens tallied from conversations based on the FTP protocol. As shown in FIG. 3.1, based on the selection criterion using 30% (i.e., 0.3 on the vertical axis) as the minimum frequency of occurrence threshold, the non-alphanumeric token 0xFFFFFFFF and all its substrings appear with the same frequency and are selected among several other candidates into the field delimiter candidates A (310a). In addition, based on the selection criterion using 40% (i.e., 0.4 on the vertical axis) as the minimum frequency of occurrence threshold, the non-alphanumeric tokens 0x0D, 0x0A, and 0x0D0A appear with the same frequency and are selected among several other candidates into the field delimiter candidates B (310b).

FIG. 3.2 shows an example of dividing conversations into corresponding slice-sets using two different field delimiter candidates. Specifically, FIG. 3.2 shows the conversation collection (320) including three conversations (i.e., C1, C2, and C3) of the same application protocol. In addition, FIG. 3.2 shows the slice sets A (322a) based on the field delimiter candidate "0x00" and the slice sets B (322b) based on the field delimiter candidate ":". For simplicity, the conversations are uni-directional having only one message, and only two field delimiter candidates are shown. In practice, the conversation collection typically includes several hundreds of conversations and the field delimiter candidates can range from one to several tens.

After the conversation is split, slice matching is performed between conversations. In one or more embodiments, any two slices from two separate conversations can be classified as one of the three following classes:

Exact match—The slices are identical (i.e., exact match).

Prefix match—The slices have a common prefix that is longer than two characters.

Other—Everything else falls in this group.

Two slices that are either exact-matched or prefix-matched are referred to as matching slices. It can be seen in FIG. 3.2 that all matching slices in the slice set A1 (320a1), slice set A2 (320a2), and slice set A3 (320a3) fall in the prefix-matched category with the matched prefixes listed as match results A (321a). In addition, all matching slices in the slice set B1 (320b1), slice set B2 (320b2), and slice set B3 (320b3) fall in the exact-matched category with the matched prefixes (in this case the prefix is the slice due to identical slices) listed as match results B (321b). Further, many slices in the slice set B1 (320b1), slice set B2 (320b2), and slice set B3 (320b3) fall in the other category and do not contribute to the match results B (321b).

FIG. 3.3 shows the field delimiter candidate score scatter plot (330) for the HTTP, GAME, FTP, and POP3 protocols. In particular, the X-axis of the field delimiter candidate score scatter plot (330) represents the field delimiter candidate scores for the field delimiter candidates used in analyzing each of these protocols. In addition, the Y-axis of the field delimiter candidate score scatter plot (330) represents the average number of slices per conversation for each conversation collection used to analyze one of these protocols.

In one or more embodiments, two statistical metrics are used for calculating the field delimiter candidate scores. Specifically, the two metrics include an exact-matched slices ratio (or percentage) and a prefix-matched slices ratio (or percentage). In one or more embodiments, the exact-matched slices ratio and prefix-matched slices ratio are calculated on a per conversation basis for each field delimiter candidate. Specifically, after the conversations are divided into slice-sets using a particular field delimiter candidate, each slice from one conversation is compared to any other conversations to identify any matching slice. If an exact match is found, this slice is classified as an exact-matched slice. If a prefix-match is found, this slice is classified as a prefix-matched slice. Accordingly, the exact-matched slices ratio is the number of exact-matched slices in a conversation divided by the total number of slices in that conversation. Similarly, the prefix-matched slices ratio is the number of prefix-matched slices in a conversation divided by the total number of slices in that conversation. The exact-matched slices ratio and the prefix-matched slices ratio are then aggregated over all conversations to determine an average exact-matched slices ratio and an average prefix-matched slices ratio assigned to the field delimiter candidate. The average exact-matched slices ratio and the average prefix-matched slices ratio are then summed and normalized for converting into the field delimiter candidate score. In one or more embodiments, the normalization is performed by multiplying the sum of these two ratios using the number of slices per conversation averaged over the conversation collection.

As shown in FIG. 3.3, each field delimiter candidate score is shown as one of four symbols listed in the legend (331). Over 20 field delimiter candidates are include in the field delimiter candidate score scatter plot (330) for each one of the four application protocols. For the FTP example, the candidate A score (332a) is the highest score while the candidate B score (332b) is the lowest score. Accordingly, the field delimiter candidate assigned the candidate A score (332a) is then selected as the actual field delimiter of the FTP protocol.

FIG. 3.4 shows an example of extracting the key-value delimiter from the actual fields of the conversations. As shown in FIG. 3.4, the conversation collection (320a) is essentially the same as the conversation collection (320) shown in FIG. 3.3 above. However, the conversations C1, C2, and C3 are divided into slices using the field delimiter (320b). Because the slices generated using actual field delimiters are the fields of the conversations C1, C2, and C3, throughout the description of FIG. 3.4, the terms "slice" and "field" are used interchangeable.

Taking one conversation at a time and select its slices one by one for examination. For each slice under examination, all conversations in the collection are compared to select the one slice (if any) from each conversation that has the highest order (i.e., longest length) LCP with the slice under examination. The result of this process is a group of slices that share prefix similarity, such as group 1 (321) selected from the conversation collection (320a) based on examining the slice "Method: 1", the group 2 (322) selected from the conversation collection (320a) based on examining the slice "Port:189", and the group 3 (323) selected from the conversation collection (320a) based on examining the slice "Bytes:1024". In one or more embodiments, the prefix-matched slices in each of these groups are identified as the key-value pairs in the respective conversations. In contrast, the exact-matched slices in each of these groups are identified as the commands in the respective conversations.

In one or more embodiments, the following heuristic is used to de-noise the groups. First, duplicates are eliminated to keep only the slices where the values are different aside from the LCP. Next, all unique slices in the group are sorted based on the length of their LCP with the initial slice that created the group. Finally, to remove the noise, only a fraction (e.g., 25%) of the most similar slices to the initial slice creating the group is retained.

In one or more embodiments, the LCP of those slices identified as key-value pairs in each group is extracted, such as the LCP 1 (331) (i.e., "Method:"), LCP 2 (332) (i.e., "Port:"), and LCP 3 (333) (i.e., "Bytes:"). Further, the longest common suffix (i.e., trailing token) are extracted from these LCPs as the key-value delimiter (334) (i.e., ":"). Once the key-value delimiter (334) is extracted, the keywords are extracted from the LCP 1 (331) (i.e., "Method:"), LCP 2 (332) (i.e., "Port:"), and LCP 3 (333) (i.e., "Bytes:") by removing the key-value delimiter (334). Accordingly, the keywords are identified as "Method", "Port", and "Bytes".

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (not shown), a mouse (not shown), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network (not shown). Further, embodiments of the invention may be implemented on a distributed system having a plurality of nodes, where each portion of the invention (e.g., various modules of FIG. 1.1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for analyzing a protocol of a network, comprising:
   obtaining a plurality of conversations from the network, wherein each of the plurality of conversations comprises a sequence of messages exchanged between a server and a client of the network using the protocol, wherein each message of the sequence of messages comprise one or more fields separated by a field delimiter of the protocol;
   extracting, by a computer processor, a plurality of non-alphanumeric tokens from the plurality of conversations, wherein the plurality of non-alphanumeric tokens comprises a non-alphanumeric token associated with a frequency of occurrence in the plurality of conversations;
   selecting, based on the frequency of occurrence meeting a pre-determined field delimiter candidate selection criterion, the non-alphanumeric token as a field delimiter candidate;
   dividing, by the computer processor and using the field delimiter candidate, each of the plurality of conversations into a plurality of slices;
   analyzing, by the computer processor and using a pre-determined field delimiter candidate scoring algorithm, content included in the plurality of slices to:
      determine a statistical measure of matched slices for each of the plurality of conversations, wherein the statistical measure of matched slices corresponds to an exact-matched-slices percentage and a prefix-matched-slices percentage that are normalized based on an average number of slices per conversation;
      determine a field delimiter candidate score by aggregating the statistical measure of matched slices for all of the plurality of conversations; and
   selecting, by the computer processor and based on the field delimiter candidate score associated with the non-alphanumeric token, the non-alphanumeric token as the field delimiter of the protocol.

2. The method of claim 1, further comprising:
   grouping the plurality of slices that are divided from each of the plurality of conversations using the field delimiter of the protocol, into a slice-set for each of the plurality of conversations, wherein the plurality of conversations correspond to a plurality of slice-sets;
   extracting, based on a pre-determined key-value delimiter selection criterion, a plurality of longest common prefixes each shared across a portion of the plurality of slice-sets; and
   extracting a common trailing token in the plurality of longest common prefixes as the key-value delimiter of the protocol.

3. The method of claim 2, further comprising:
   selecting a first slice from the plurality of sets of slices;
   selecting a second slice from each slice-set of a portion of the plurality of slice-sets to generate a group of selected slices, wherein the second slice is selected based on a length of a common prefix shared by the first slice and the second slice; and
   analyzing the group of selected slices to identify at least one of the plurality of longest common prefixes.

4. The method of claim 3,
   wherein the first slice is selected from a first slice-set of the plurality of slice-sets, and
   wherein the second slice is selected from each slice-set of the plurality of slice-sets aside from the first slice-set.

5. The method of claim 2, further comprising:
   removing the common trailing token from the plurality of longest common prefixes to identify a keyword of the protocol.

6. The method of claim 2, further comprising:
   identifying a command of the protocol from a slice of the plurality of slices that does not include a key-value delimiter.

7. A system for analyzing a protocol of a network, comprising one or more processors with memory executing:
   an acquisition module configured to:
      obtain a plurality of conversations from the network, wherein each of the plurality of conversations comprises a sequence of messages exchanged between a server and a client of the network using the protocol, wherein each message of the sequence of messages comprise one or more fields separated by a field delimiter of the protocol;
   a field delimiter extractor configured to:
      extract a plurality of non-alphanumeric tokens from the plurality of conversations, wherein the plurality of non-alphanumeric tokens comprises a non-alphanumeric token associated with a frequency of occurrence in the plurality of conversations;
      select, based on the frequency of occurrence meeting a pre-determined field delimiter candidate selection criterion, the non-alphanumeric token as a field delimiter candidate of a plurality of field delimiter candidates;
      divide, using the field delimiter candidate, each of the plurality of conversations into a plurality of slices;
      analyze, using a pre-determined field delimiter candidate scoring algorithm, content included in the plurality of slices to:
         determine a statistical measure of matched slices for each of the plurality of conversations, wherein the statistical measure of matched slices corresponds to an exact-matched-slices percentage and a prefix-matched-slices percentage that are normalized based on an average number of slices per conversation;
         determine a field delimiter candidate score by aggregating the statistical measure of matched slices for all of the plurality of conversations; and
      select, based on the field delimiter candidate score associated with the non-alphanumeric token, the non-alphanumeric token from the plurality of field delimiter candidates as the field delimiter of the protocol; and
   a repository configured to store the plurality of conversations, the plurality of non-alphanumeric tokens, and the plurality of field delimiter candidates.

8. The system of claim 7, further comprising the one or more processors executing a key-value delimiter extractor configured to:
   group the plurality of slices that are divided from each of the plurality of conversations using the field delimiter of the protocol, into a slice-set for each of the plurality of conversations, wherein the plurality of conversations correspond to a plurality of slice-sets;
   extract, based on a pre-determined key-value delimiter selection criterion, a plurality of longest common prefixes each shared across a portion of the plurality of slice-sets; and
   extract a common trailing token in the plurality of longest common prefixes as the key-value delimiter of the protocol.

9. The system of claim 8, wherein the one or more processors executing the key-value delimiter extractor is further configured to:
- select a first slice from the plurality of sets of slices;
- select a second slice from each slice-set of a portion of the plurality of slice-sets to generate a group of selected slices, wherein the second slice is selected based on a length of a common prefix shared by the first slice and the second slice; and analyze the group of selected slices to identify at least one of the plurality of longest common prefixes.

10. The system of claim 9,
- wherein the first slice is selected from a first slice-set of the plurality of slice-sets, and
- wherein the second slice is selected from each slice-set of the plurality of slice-sets aside from the first slice-set.

11. The system of claim 8, further comprising the one or more processors executing a keyword extractor configured to:
- remove the common trailing token from the plurality of longest common prefixes to identify a keyword of the protocol.

12. The system of claim 8, further comprising the one or more processors executing a command extractor configured to:
- identify a command of the protocol from a slice of the plurality of slices that does not include a key-value delimiter.

13. A non-transitory computer readable medium embodying instructions for analyzing a protocol of a network, the instructions when executed by a processor comprising functionality for:
- obtaining a plurality of conversations from the network, wherein each of the plurality of conversations comprises a sequence of messages exchanged between a server and a client of the network using the protocol, wherein each message of the sequence of messages comprise one or more fields separated by a field delimiter of the protocol;
- extracting a plurality of non-alphanumeric tokens from the plurality of conversations, wherein the plurality of non-alphanumeric tokens comprises a non-alphanumeric token associated with a frequency of occurrence in the plurality of conversations;
- selecting, based on the frequency of occurrence meeting a pre-determined field delimiter candidate selection criterion, the non-alphanumeric token as a field delimiter candidate;
- dividing, using the field delimiter candidate, each of the plurality of conversations into a plurality of slices;
- analyzing, using a pre-determined field delimiter candidate scoring algorithm, content included in the plurality of slices to:
  - determine a statistical measure of matched slices for each of the plurality of conversations, wherein the statistical measure of matched slices corresponds to an exact-matched-slices percentage and a prefix-matched-slices percentage that are normalized based on an average number of slices per conversation;
  - determine a field delimiter candidate score by aggregating the statistical measure of matched slices for all of the plurality of conversations; and
- selecting, based on the field delimiter candidate score associated with the non-alphanumeric token, the non-alphanumeric token as the field delimiter of the protocol.

14. The non-transitory computer readable medium of claim 13, further comprising:
- grouping the plurality of slices that are divided from each of the plurality of conversations using the field delimiter of the protocol, into a slice-set for each of the plurality of conversations, wherein the plurality of conversations correspond to a plurality of slice-sets;
- extracting, based on a pre-determined key-value delimiter selection criterion, a plurality of longest common prefixes each shared across a portion of the plurality of slice-sets; and
- extracting a common trailing token in the plurality of longest common prefixes as the key-value delimiter of the protocol.

15. The non-transitory computer readable medium of claim 14, further comprising:
- selecting a first slice from the plurality of sets of slices;
- selecting a second slice from each slice-set of a portion of the plurality of slice-sets to generate a group of selected slices, wherein the second slice is selected based on a length of a common prefix shared by the first slice and the second slice; and analyzing the group of selected slices to identify at least one of the plurality of longest common prefixes.

16. The non-transitory computer readable medium of claim 15,
- wherein the first slice is selected from a first slice-set of the plurality of slice-sets, and
- wherein the second slice is selected from each slice-set of the plurality of slice-sets aside from the first slice-set.

17. The non-transitory computer readable medium of claim 14, further comprising:
- removing the common trailing token from the plurality of longest common prefixes to identify a keyword of the protocol.

18. The non-transitory computer readable medium of claim 14, further comprising:
- identifying a command of the protocol from a slice of the plurality of slices that does not include a key-value delimiter.

\* \* \* \* \*